United States Patent

[11] 3,624,354

| [72] | Inventor | John H. Heidorn |
| | | Dayton, Ohio |
| [21] | Appl. No. | 77,878 |
| [22] | Filed | Oct. 5, 1970 |
| [45] | Patented | Nov. 30, 1971 |
| [73] | Assignee | General Motors Corporation |
| | | Detroit, Mich. |

[54] THERMOSTATIC CONTROLLED DEFROSTER SWITCH
3 Claims, 4 Drawing Figs.

[52] U.S. Cl. .................................................. 219/494, 337/365, 219/522
[51] Int. Cl. .................................................. H05b 1/02
[50] Field of Search .......................................... 219/412, 413, 494, 508, 522; 337/365

[56] References Cited
UNITED STATES PATENTS

| 2,745,937 | 5/1956 | Welch | 219/413 |
| 2,475,038 | 7/1949 | Lucas | 337/365 |
| 2,935,591 | 5/1960 | Lee | 219/413 |

Primary Examiner—Bernard A. Gilheany
Assistant Examiner—F. E. Bell
Attorneys—W. S. Pettigrew, J. C. Evans and K. H. McLean, Jr.

ABSTRACT: In preferred form, an automobile windshield defroster utilizing dual electric resistance elements to heat air which is then directed against the windshield. A thermostatic switch initially connects the dual resistance element in parallel for maximum heat output and subsequently connects the dual resistance elements in series for a reduced heat output.

PATENTED NOV 30 1971

3,624,354

INVENTOR.
John H. Heidorn
BY
K. H. MacLean, Jr.
ATTORNEY ic current source; a second terminal of said thermostatic switch means connected to said current source; normally engaged contacts connecting said first terminal with first leads of said heating elements; said second terminal being connected to the second lead of one heating element; conductor means connected to the second lead of the other heating ele-

THERMOSTATIC CONTROLLED DEFROSTER SWITCH

This invention relates to automobile windshield defrosters.

During the winter months, fog and frost may form on the inside of the automobile windshield. When this happens, it is desirable to pass warm air against the inside surface of the windshield to eliminate the frost or fog. Electrical resistance heaters are especially desirable for heating the defrosting air because they provide heat instantaneously and do not require an extensive warm up period as does an engine coolant heater.

The subject invention utilizes two electric resistance heating elements to warm a flow of air which is subsequently directed against the inside surface of the windshield. It is desirable to initially produce a maximum heat output and a higher temperature for defrosting. After initial defrosting, a lower heat output is sufficient. A thermostatic switch which is placed in a circuit to energize the dual resistance elements initially connects the elements in parallel for maximum heating of the defrosting air. Subsequently, the switch connects the elements in series for reduced heating of the air. This change in heating modes is accomplished automatically by a bimetal strip which forms part of the circuit to the resistance elements. In a first mode of operation, the bimetal element presses against a terminal which places the resistance elements in parallel. As the bimetal heats due to current flow therethrough, the force of the bimetal strip against the terminal is relieved and a toggle spring snaps the bimetal to a second operative position. In the second operative position, contact closes for series connection of the elements.

In an alternate embodiment, the resistance wire heaters may be embedded in the glass of the window itself. The sequential operation of the switch will initially provide a great amount of heat followed by a lesser quantity.

Therefore, an object of the invention is to provide an automobile windshield defrosting system with dual sequential heating modes of operation for warming air which is then directed against the automobile windshield. A still further object of the invention is to provide an automobile defrosting system including two electric resistance heating elements for warming air to be directed against the automobile windshield and a thermostatic switch to initially connect the two resistance elements in parallel for maximum heat output and subsequently to automatically connect the elements in series for a reduced heat output.

Further objects and advantages of the present invention will be apparent from the following detailed description, reference being made to the accompanying drawings in which a preferred embodiment is illustrated.

Figure 1:
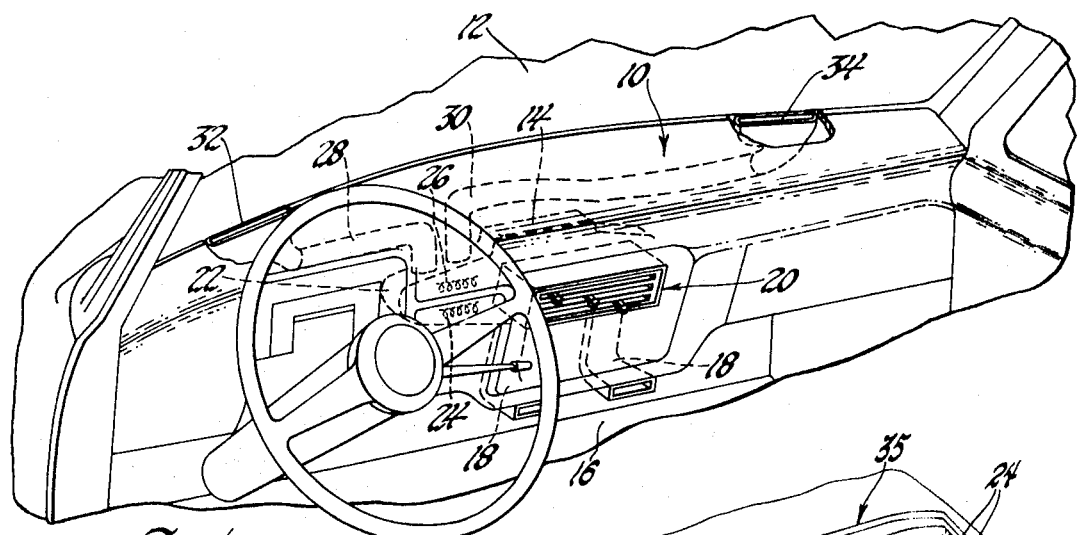
FIG. 1 is a perspective view of an automobile dashboard including the subject defrosting system.

An automobile dashboard 10 is illustrated in FIG. 1. Immediately above the dashboard 10 is the windshield 12. Beneath dashboard 10 is an automobile heater generally referred to by the numeral 14. This heater may be of the type warmed by engine coolant. Air is discharged into the passenger compartment 16 of the automobile through outlet ducts 18. A heater control panel 20 is mounted in dashboard 10 for selecting various modes of operation such as heating or defrosting and for setting a desirable temperature level for the heater.

Behind the dashboard 10 within a hollow duct 22 are dual electrical resistance heating elements 24 and 26 for warming air. The warmed air flows through ducts 28 and 30 to outlets 32 and 34 at the base of windshield 12. The outlets 32 and 34 direct the warmed air against the inside surface of the windshield for defrosting or defogging action.

Figure 2:
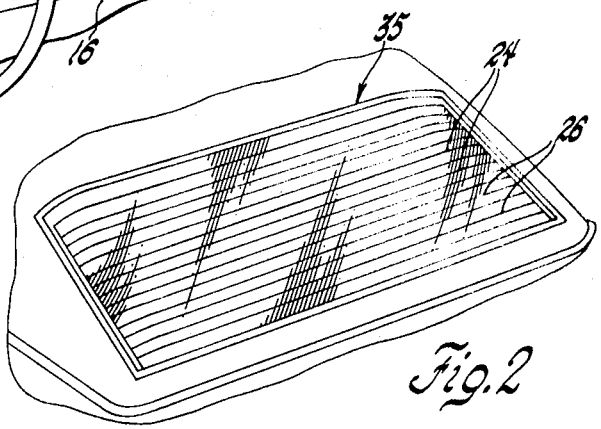
FIG. 2 is a perspective of an automobile rear window with embedded resistance elements.

In FIG. 2, the resistance heating elements 24 and 26 are embedded in the glass of the automobile rear window 35. Thus, they directly warm the window to remove fog or frost.

Figure 3:
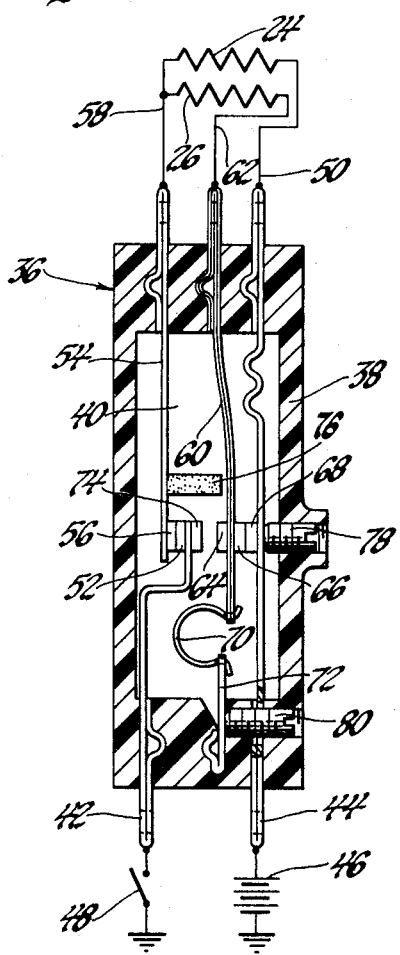
FIG. 3 is a sectioned view of the systems thermostatic switch on its first heating mode of operation.
Figure 4:
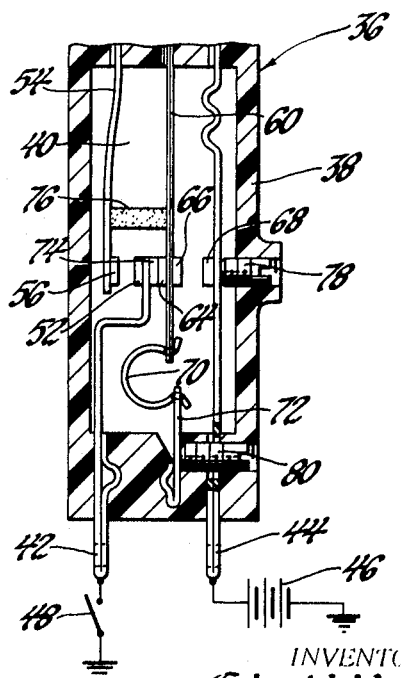
FIG. 4 is a sectioned view of the thermostatic switch in its second heating mode of operation.

The resistance elements 24 and 26 are energized by a circuit including a thermostatic switch 36, best shown in FIGS. 2 and 3. Switch 36 includes a frame 38 of a plastic type material which has a hollow interior 40. Cover plates (not shown) enclose the interior 40. First and second terminals 42 and 44 are embedded within the frame 38 and are connected across an electric current source or battery 46. A manually operated switch 48 energizes the elements 24 and 26 whenever defrosting is desired. Terminal 44 extends through the interior space 40 into the other end of frame 38 and is connected to a least 50 of resistance element 24. The terminal 42 also extends into the interior space 40 and has a contact 52 on its end. A cantilevered arm 54 has one end portion embedded in the frame 38 and another end portion extending into the interior space 40. A contact 56 on arm 54 within the space 40 normally engages the contact 52 to complete a circuit through terminal 42, contacts 52 and 56, arm 54 and a common lead 58 of elements 24 and 26.

The switch 36 also includes a bimetal strip 60 which has one end embedded in the plastic frame 38 and another end projecting into the interior space 40. The bimetal strip 60 is connected to a lead 62 of resistance element 26. Strip 60 carries contacts 64 and 66 on its free end within the interior 40. When in a first position, bimetal strip 60 is resiliently biased toward the right against contact 68 on the terminal 44. This completes parallel circuits from battery 46, through terminal 44 and lead 50 to the resistance element 24 and from battery 46 through terminal 44, contacts 68 and 66, strip 60 and lead 62 to the resistance element 26. The circuit is completed from the common lead 58 of elements 24 and 26 through arm 54, contacts 56 and 52, terminal 42 and switch 48. In this first position, elements 24 and 26 are connected to the battery 46 in parallel to achieve maximum current through the elements and resultant maximum heating of air for defrosting.

When a predetermined heating of bimetal strip 60 is caused by current therethrough, a toggle spring 70 snaps the bimetal strip 60 into a second position shown in FIG. 3. The toggle spring 70 extends between the free end of bimetal strip 60 and a post 72 supported by the frame 38. When bimetal strip 60 is snapped to the left as shown in FIG. 3, contact 64 engages a contact 74 on terminal 42. Simultaneously, a pin 76 between the arm 54 and the strip 60 disengages contacts 52 and 56. This completes a circuit from the battery 46 through terminal 44, lead 50, resistance elements 24 and 26 in series, lead 62, bimetal strip 60, contacts 64 and 74, terminal 42 and switch 48 to the battery 46. The resistance elements 24 and 26 are automatically connected in series in response to heating of the bimetal strip 60 to reduce their heat output.

The relative position of the end of the bimetal strip 60 in its cold position shown in FIG. 2 and post 72 is important to enable the toggle spring 70 to snap the bimetal strip 60 into the position shown in FIG. 3. Set screws 78 and 80 can be adjusted to cause movement of the strip 60 and post 72.

While the embodiment of the present invention as herein described constitutes a preferred form, it is to be understood that other forms might be adapted.

What is claimed is as follows:

1. An automobile windshield defrosting system with automatic sequential heating modes comprising: means for directing heated air against the inside surface of the automobile windshield; said means including first and second electric resistance elements for heating the air; a circuit for energizing said heating elements including an electric current source; said circuit further including thermostatic switch means for initially energizing said heating elements in parallel to produce a first mode of operation and for subsequently energizing said heating elements in series to produce a second mode of operation; a first terminal of said thermostatic switch means connected to said current source; a second terminal of said thermostatic switch means connected to said current source; normally engaged contacts connecting said first terminal with first leads of said heating elements; said second terminal being connected to the second lead of one heating element; conductor means connected to the second lead of the other heating element and contacting said second terminal when in its first operative position to complete a circuit extending from said current source, through said second terminal and said conductor means, through said heating elements in parallel, through said first leads, said contacts and said first terminal to said current source; said conductor means movable from its first operative position in contact with said second terminal into its second operative position in contact with said first terminal in response to heat producing current through said conductor means; said conductor means completing a circuit in its second operative position extending from said current source, through said second terminal, said heating elements in series, said conductor means and said first terminal to said current source; means for disengaging said contacts between said first terminal and said first leads of said heating elements when said conductor means moves into the second operative position.

2. An automobile windshield defrosting system with automatic sequential heating modes comprising: means for directing heated air against the inside surface of the automobile windshield; said means including first and second electric resistance elements for heating the air; a circuit for energizing said heating elements including an electric current source; said circuit further including thermostatic switch means for initially energizing said heating elements in parallel to produce a first mode of operation and for subsequently energizing said heating elements in series to produce a second mode of operation; a first terminal of said thermostatic switch means connected to said current source; a second terminal of said thermostatic switch means connected to said current source; a resilient cantilevered arm connected to first leads of said heating elements and contacting said first terminal at its free end when said switch is in its first mode position; said second terminal being connected to the second lead of one heating element; a cantilevered bimetal strip connected to the second lead of the other heating element; said cantilevered bimetal strip contacting said second terminal when said switch is in its first operative position to complete a circuit extending from said current source, through said second terminal and said bimetal strip, through said heating elements in parallel, through said first leads, said cantilevered arm and said first terminal to said current source; spring means for rapidly moving said bimetal strip from its first operative position into its second operative position contacting said first terminal in response to movement of said bimetal strip caused by heat producing current therethrough; said bimetal strip completing a circuit when in its second operative position extending from said current source, through said second terminal, said heating elements in series, said bimetal strip and said first terminal to said current source; means between said bimetal strip and said resilient arm for disengaging said arm from said first terminal when said bimetal strip moves to its second operative position.

3. An automobile windshield defrosting system with automatic sequential heating modes comprising: means for directing heater air against the inside surface of the automobile windshield; said means including first and second electric resistance elements for heating the air; a circuit for energizing said heating elements including an electric current source; said circuit further including thermostatic switch means for initially energizing said heating elements in parallel to produce a first mode of operation and for subsequently energizing said heating elements in series to produce a second mode of operation; a first terminal of said thermostatic switch means connected to said current source; a second terminal of said thermostatic switch means connected to said current source; a resilient cantilevered arm connected to first leads of said heating elements and contacting said first terminal at its free end when said switch is in its first mode position; said second terminal being connected to the second lead of one heating element; a cantilevered bimetal strip connected to the second lead of the other heating element; said cantilevered bimetal strip contacting said second terminal when said switch is in its first operative position to complete a circuit extending from said current source, through said second terminal and said bimetal strip, through said heating elements in parallel, through said first leads, said cantilevered arm and said first terminal to said current source; springs means for rapidly moving said bimetal strip from its first operative position into its second operative position contacting said first terminal in response to movement of said bimetal strip caused by heat producing current therethrough; said spring means comprises a C-shaped leaf spring with ends contacting the free end of said bimetal strip and a stationary post, adjustment means for changing the relative positions of the free end of said bimetal strip and said post; said bimetal strip completing a circuit when in its second operative position extending from said current source, through said second terminal, said heating elements in series, said bimetal strip and said first terminal to said current source; means between said bimetal strip and said resilient arm for disengaging said arm from said first terminal when said bimetal strip moves to its second operative position.

* * * * *